US008456129B2

(12) United States Patent
Hsieh

(10) Patent No.: US 8,456,129 B2
(45) Date of Patent: Jun. 4, 2013

(54) OUTDOOR MONITORING SYSTEM

(75) Inventor: Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 307 days.

(21) Appl. No.: 12/960,447

(22) Filed: Dec. 3, 2010

(65) Prior Publication Data
US 2012/0098479 A1 Apr. 26, 2012

(30) Foreign Application Priority Data

Oct. 22, 2010 (TW) .............................. 99136096 A

(51) Int. Cl.
H01M 10/44 (2006.01)
H02J 7/00 (2006.01)
(52) U.S. Cl.
USPC ............ 320/101; 320/103; 320/106; 320/110
(58) Field of Classification Search
USPC ......................................... 320/101, 103, 106
See application file for complete search history.

(56) References Cited

U.S. PATENT DOCUMENTS

| 8,008,889 | B2* | 8/2011 | Noda ............................. 320/110 |
| 2005/0007063 | A1* | 1/2005 | Sekai ............................ 320/101 |
| 2007/0132426 | A1* | 6/2007 | Kim et al. ..................... 320/101 |
| 2010/0237785 | A1* | 9/2010 | Lee ............................... 315/150 |
| 2011/0074337 | A1* | 3/2011 | Adachi .......................... 320/101 |
| 2011/0187311 | A1* | 8/2011 | Zhao et al. .................... 320/101 |
| 2012/0032516 | A1* | 2/2012 | Lee ................................ 307/66 |

* cited by examiner

Primary Examiner — M'baye Diao
(74) Attorney, Agent, or Firm — Altis Law Group, Inc.

(57) ABSTRACT

An outdoor monitoring system includes a camera, a direct-current adapter, a solar cell unit and a power management unit. The power management unit includes a controller, a rechargeable power source, a first voltage detection circuit, and a second voltage detection circuit. The first voltage detection circuit detects a charging voltage of the solar cell unit for charging the rechargeable power source. The second voltage detection circuit detects an output voltage of the rechargeable power source applied to the camera. The controller selectively connects the rechargeable power source or the direct-current adapter to the camera according to the output voltage and connects or disconnects the rechargeable power source to the solar cell unit according the output voltage and the charging voltage.

8 Claims, 2 Drawing Sheets

OUTDOOR MONITORING SYSTEM

BACKGROUND

1. Technical Field

The present disclosure relates to outdoor monitoring systems.

2. Description of Related Art

Monitoring systems are widely used for security. Monitoring systems typically include a camera for capturing images of places. The camera is powered by a direct-current (DC) adapter, which converts an alternating current into a direct current. However, the camera is always powered on day and night. This consumes a large amount of energy.

Therefore, an outdoor monitoring system, which can overcome the limitations described, is needed.

DETAILED DESCRIPTION

Figure 1:
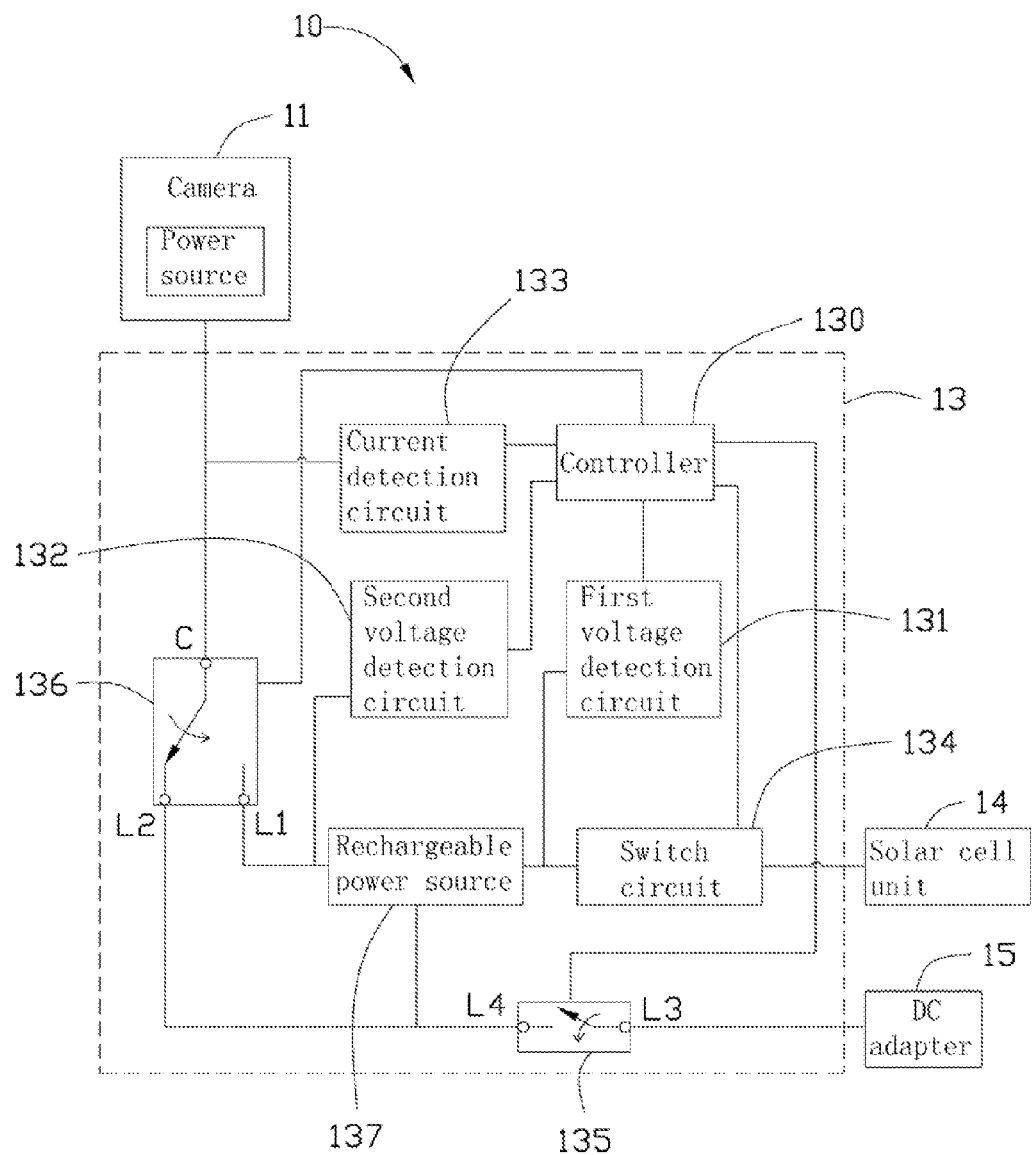
FIG. 1 is a functional block diagram of an outdoor monitoring system including a camera and a solar cell unit, according to an exemplary embodiment.
Figure 2:
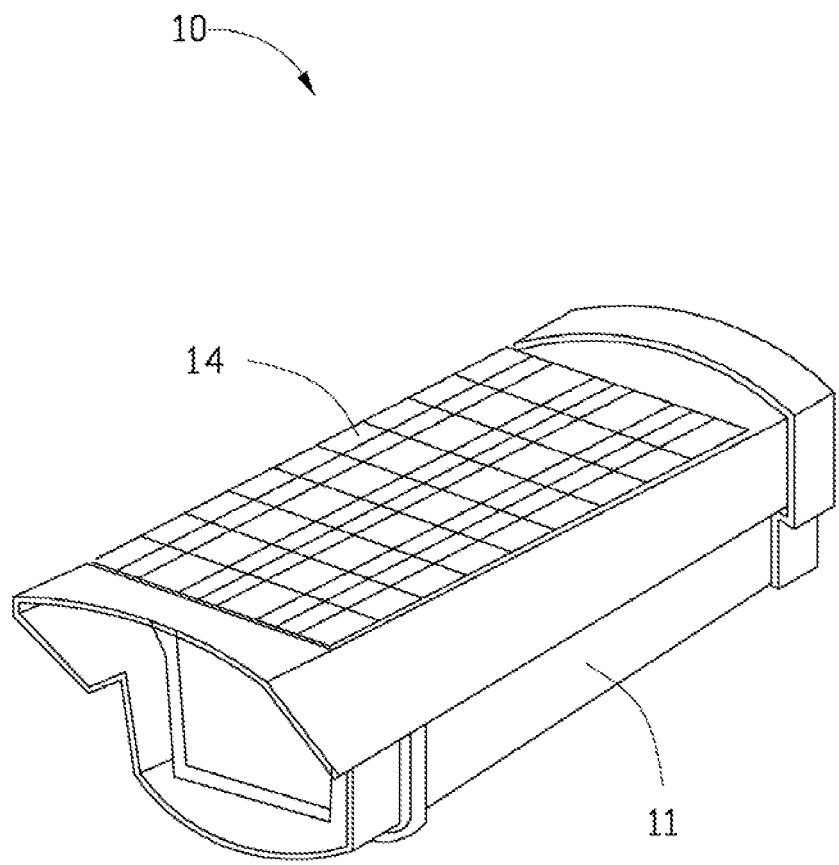
FIG. 2 is a schematic and isometric view of the camera and the solar cell unit of FIG. 1.

Referring to FIGS. 1 and 2, an outdoor monitoring system 10, according to an exemplary embodiment, includes a camera 11, a power management unit 13, a solar cell unit 14 and a direct-current (DC) adapter 15.

The camera 11 captures images. The images can be displayed on a display and can be stored in an internal memory of the camera 11 or in an external memory.

The solar cell unit 14 may be a dye sensitized solar cell unit, a polymer solar cell unit, or a silicon thin film solar cell unit. In this embodiment, the camera 11 is mounted outdoors and the solar cell unit 14 is attached to the top surface of the camera 11. In alternative embodiments, the solar cell unit 14 may be attached to another place other than the camera 11, where the solar cell unit 14 can receive light.

The DC adapter 15 converts an alternating current into a desirable direct current for use with the camera 11.

The power management unit 13 is configured for selectively connecting the solar cell unit 14 or the DC adapter 15 to the camera 11. The power management unit 13 includes a controller 130, a first voltage detection circuit 131, a second voltage detection circuit 132, a current detection circuit 133, a switch circuit 134, a first switch 135, a second switch 136, and a rechargeable power source 137. In this embodiment, the first switch 135 is an SPST-type (single pole, single throw-type) switch and the second switch 136 is an SPDT-type (single pole, double throw-type) switch.

An input end of the switch circuit 134 is electrically connected to the solar cell unit 14. The control end of the switch circuit 134 is electrically connected to the controller 130. An output end of the switch circuit 134 is electrically connected to the rechargeable power source 137. The switch circuit 134 may include a MOSFET (metal-oxide-semiconductor field-effect transistor) switch.

The first voltage detection circuit 131 is configured for detecting a charging voltage of the solar cell unit 14 for charging the rechargeable power source 137 output from the switch circuit 134. A first end of the first voltage detection circuit 131 is electrically connected between the output end of the switch circuit 134 and the rechargeable power source 137. A second end of the first voltage detection circuit 131 is electrically connected to the controller 130. The detected charging voltage is transmitted to the controller 130.

The second voltage detection circuit 132 is configured for detecting an output voltage of the rechargeable power source 137 applied to the camera 11. A first end of the second voltage detection circuit 132 is electrically connected between the rechargeable power source 137 and a first end L1 of the second switch 136. A second end of the second voltage detection circuit 132 is electrically connected to the controller 130. The detected output voltage is transmitted to the controller 130. The first end L1 of the second switch 136 is electrically connected to the rechargeable power source 137.

A first end of the current detection circuit 133 is electrically connected to a third end C of the second switch 136 and the camera 11. A second end of the current detection circuit 133 is electrically connected to the controller 130. The current detection circuit 133 is configured for detecting a current outputted to the camera 11. The detected current is transmitted to the controller 130. The camera 11 is electrically connected to the third end C of the second switch 136 and the first end of the current detection circuit 133. The first switch 135 and the second switch 136 are electrically connected to the controller 130. A first end L3 of the first switch 135 is electrically connected to the DC adapter 15. A second end L4 of the first switch 135 is electrically connected to a second end L2 of the second switch 136.

The controller 130 is configured for selectively connecting the rechargeable power source 137 or the DC adapter 15 to the camera 11 according to the output voltage, and configured for connecting or disconnecting the rechargeable power source 137 to the solar cell unit 14 according to the charging voltage and the output voltage, and configured for powering on or off the camera 11 according to the detected current.

Specifically, if the output voltage is smaller than a first predetermined value, no matter whatever the charging voltage is and the controller 130 controls the switch circuit 134 to open, and controls the first switch 135 to close (i.e., the first end L3 of the first switch 135 is electrically connected to the second end L4 of the first switch 135), and controls the third end C of the second switch 136 to connect to the second end L2 of the second switch 136. In this way, the DC adapter 15 charges the rechargeable power source 137, and the camera 11 is electrically connected to and powered by the DC adapter 15, and the rechargeable power source 137 is disconnected to the solar cell unit 14. The first predetermined value may be a desirable voltage value for a normal work of the camera 11.

If the output voltage is greater than or equal to the first predetermined value and the charging voltage is smaller than a second predetermined value, the controller 130 controls the switch circuit 134 and the first switch 135 to open, and controls the third end C of the second switch 136 to connect to the first end L1 of the second switch 136. In this way, the camera 11 is electrically connected to and powered by the rechargeable power source 137, and the rechargeable power source 137 is disconnected from the solar cell unit 14. The second predetermined value may be a desirable voltage value for charging the rechargeable power source 137.

If the output voltage is greater than or equal to the first predetermined value and the charging voltage is greater than or equal to the second predetermined value, the controller 130 controls the switch circuit 134 to close, and controls the first switch 135 to open, and controls the third end C of the second switch 136 to connect to the first end L1 of the second switch 136. In this way, the camera 11 is electrically connected to and is powered by the rechargeable power source 137 and the rechargeable power source 137 is connected to and charged by the solar cell unit 14. Energy of the solar cell unit 14 can be used.

If the detected current is greater than a third predetermined value, the controller 130 controls the third end C of the second switch 136 to connected to the second end L2 of the second switch 136, and controls the first switch 135 to open. The third predetermined value may be a safe current value for the camera 11. In this way, the camera 11 is powered off and therefore can be protected.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An outdoor monitoring system, comprising:
    a camera;
    a direct-current (DC) adapter for converting an alternating current into a direct current;
    a solar cell unit configured for converting light into electrical energy; and
    a power management unit, the power management unit comprising a controller, a rechargeable power source, a first voltage detection circuit, a second voltage detection circuit, a first switch, a second switch, and a switch circuit;
    the solar cell unit electrically connected to the rechargeable power source via the switch circuit, the rechargeable power source electrically connected to a first end of the second switch, the DC adapter electrically connected to a second end of the second switch via the first switch, the DC adapter electrically connected to the rechargeable power source via the first switch, a third end of the second switch electrically connected to the camera, the controller electrically connected to the first switch, the second switch, and the switch circuit, a first end of the first voltage detection circuit electrically connected between the rechargeable power source and an output end of the switch circuit, a second end of the first voltage detection circuit electrically connected to the controller, a first end of the second voltage detection circuit electrically connected between the rechargeable power source and the first end of the second switch, a second end of the second voltage detection circuit electrically connected to the controller; and
    the first voltage detection circuit configured for detecting a charging voltage of the solar cell unit for charging the rechargeable power source, the second voltage detection circuit configured for detecting an output voltage of the rechargeable power source applied to the camera, the controller configured for selectively connecting the rechargeable power source or the DC adapter to the camera according to the output voltage and configured for connecting or disconnecting the rechargeable power source to or from the solar cell unit according to the output voltage and the charging voltage.

2. The outdoor monitoring system of claim 1, wherein the power management unit further comprises a current detection circuit configured for detecting a current outputted to the camera, a first end of the current detection circuit is electrically connected between the camera and the third end of the second switch, and a second end of the current detection circuit is electrically connected to the controller.

3. The outdoor monitoring system of claim 2, wherein the controller is further configured for powering on or off the camera according to the detected current.

4. The outdoor monitoring system of claim 1, wherein an input end of the switch circuit is electrically connected to the solar cell unit, a control end of the switch circuit is electrically connected to the controller, and the output end of the switch circuit is electrically connected to the rechargeable power source.

5. The outdoor monitoring system of claim 1, wherein if the output voltage is smaller than a first predetermined value, the controller is configured for controlling the switch circuit to open, controlling the first switch to close, and controlling the third end of the second switch to connect to the second end of the second switch thus connecting the DC adapter to the camera, disconnecting the rechargeable power source from the camera, and disconnecting the rechargeable power source from the solar cell unit; and if the output voltage is greater than or equal to the first predetermined value, the controller is configured for connecting the rechargeable power source to the camera and disconnecting the DC adapter from the camera.

6. The outdoor monitoring system of claim 5, wherein if the output voltage is greater than or equal to the first predetermined value and the charging voltage is smaller than a second predetermined value, the controller is configured for controlling the switch circuit and the first switch to open and controlling the third end of the second switch to connect to the first end of the second switch thus disconnecting the DC adapter from the camera, connecting the rechargeable power source to the camera, and disconnecting the rechargeable power source from the solar cell unit; and if the output voltage is greater than or equal to the first predetermined value and the charging voltage is greater than or equal to the second predetermined value, the controller is configured for controlling the switch circuit to close, controlling the first switch to open, and controlling the third end of the second switch to connect to the first end of the second switch thus connecting the rechargeable power source to the camera, disconnecting the DC adapter from the camera, and connecting the rechargeable power source to the solar cell unit.

7. The outdoor monitoring system of claim 1, wherein the solar cell unit is a dye sensitized solar cell unit, a polymer solar cell unit, or a silicon thin film solar cell unit.

8. The outdoor monitoring system of claim 1, wherein the first switch is a single pole, single throw-type (SPST-type) switch, the second switch is a single pole, double throw-type (SPDT-type) switch, and the switch circuit is a metal-oxide-semiconductor field-effect transistor (MOSFET) switch.

* * * * *